US008162255B2

(12) United States Patent
Weaver et al.

(10) Patent No.: US 8,162,255 B2
(45) Date of Patent: Apr. 24, 2012

(54) AERODYNAMICALLY-ASSISTED LANDING GEAR

(75) Inventors: Thomas L. Weaver, Webster Groves, MO (US); James J. Sheahan, Jr., Florissant, MO (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 12/245,916

(22) Filed: Oct. 6, 2008

(65) Prior Publication Data
US 2010/0084509 A1  Apr. 8, 2010

(51) Int. Cl.
*B64C 25/00* (2006.01)
(52) U.S. Cl. .................................... 244/102 R
(58) Field of Classification Search ............... 244/100 R, 244/102 R, 102 A, 102 SS, 103 S, 103 W
See application file for complete search history.

(56) References Cited

U.S. PATENT DOCUMENTS

| | | | | | |
|---|---|---|---|---|---|
| 1,834,254 | A | * | 12/1931 | Reid ............................ | 244/102 R |
| 2,186,266 | A | * | 1/1940 | Onions ..................... | 244/102 SS |
| 2,222,975 | A | * | 11/1940 | Brown ........................ | 244/102 R |
| 2,354,116 | A | * | 7/1944 | Hajek, Jr. .................. | 244/102 R |
| 2,446,399 | A | * | 8/1948 | Woods ............................. | 244/54 |
| 2,511,362 | A | * | 6/1950 | Mercier ......................... | 244/202 |
| 2,941,756 | A | * | 6/1960 | Roberts .................... | 244/102 R |
| 5,681,014 | A | | 10/1997 | Palmer .......................... | 244/219 |
| 6,109,566 | A | | 8/2000 | Miller et al. ................... | 244/207 |
| 6,619,587 | B1 | * | 9/2003 | Chow et al. ............... | 244/100 R |
| 7,458,542 | B2 | * | 12/2008 | Chow et al. ............... | 244/102 R |
| 7,651,053 | B2 | * | 1/2010 | Fort ............................ | 244/129.4 |
| 7,861,971 | B2 | * | 1/2011 | Ponsart et al. ............. | 244/129.5 |
| 7,954,757 | B2 | * | 6/2011 | Moe et al. ................. | 244/100 A |
| 2003/0029966 | A1 | * | 2/2003 | Derrien et al. ............. | 244/102 R |
| 2003/0102406 | A1 | * | 6/2003 | Chow et al. ............... | 244/100 R |
| 2006/0065779 | A1 | * | 3/2006 | McCoskey et al. ........ | 244/100 R |
| 2006/0102775 | A1 | * | 5/2006 | Chow et al. ................... | 244/1 N |
| 2007/0108344 | A1 | * | 5/2007 | Wood ......................... | 244/102 R |
| 2008/0142634 | A1 | * | 6/2008 | Moe et al. ..................... | 244/1 N |
| 2009/0008501 | A1 | * | 1/2009 | Chow et al. ............... | 244/100 R |
| 2009/0078821 | A1 | * | 3/2009 | Chow et al. ................... | 244/1 N |
| 2009/0084894 | A1 | * | 4/2009 | Wood ......................... | 244/102 R |
| 2009/0127388 | A1 | * | 5/2009 | Herzberger et al. .......... | 244/101 |

OTHER PUBLICATIONS

Valdis Kibens and William W. Bower, Article entitled, "An Overview of Active Flow Control Applications at The Boeing Company," published by the American Institute of Aeronautics and Astronautics (AIAA), Inc. at the $2^{nd}$ AIAA Flow Control Conference, Jun. 28-Jul. 1, 2004 in Portland, Oregon. 17 pages.
Article/Text entitled, "Aerial Refuelling Boom and Receiver," from a web page address at http://www.aerospaceweb.org/question/design/q0213.shtml.

* cited by examiner

*Primary Examiner* — Rob Swiatek
*Assistant Examiner* — Marisa Conlon
(74) *Attorney, Agent, or Firm* — Hope Baldauff Hartman, LLC (57) ABSTRACT

Apparatus and methods provide for the use of a lift-producing body with a landing gear assembly in order to provide a lifting force during landing gear operations that reduces the load on the landing gear actuator. According to embodiments, the lift-producing body may be configured for attachment to the landing gear assembly. The lift-producing body may be reconfigured while the landing gear assembly is being retracted or deployed in order to maximize the aerodynamic lift created by the lift-producing body or to minimize the drag induced by the lift-producing body.

23 Claims, 7 Drawing Sheets

AERODYNAMICALLY-ASSISTED LANDING GEAR

BACKGROUND

Increasing the efficiency of all types of power systems is an ongoing challenge that is particularly valuable in the aircraft industry. As the efficiency of various systems increases, the size of corresponding components typically decreases, which results in system weight and power requirement reductions. One particularly large power requirement in an aircraft results from the landing gear being raised and lowered. Operating the landing gear creates a large load on the system, electric or hydraulic, which is required to power the gear actuators. With large aircraft, the problem is amplified since the landing gear assemblies of large aircraft are particularly large and heavy and may be numerous.

One solution to the problem is to provide a large power supply to the landing gear system while raising and lowering the gear. With this solution, the size of the applicable power system must accommodate the increased load demands present during take-off and climb-out, including the increased load associated with raising the landing gear. A disadvantage to doing so is that sizing the power system to support these loads makes the power system undesirably large and heavy or can result in requiring the addition of dedicated local power supplies. This increased weight must be carried by the aircraft during the entire flight, which increases the fuel consumption of the aircraft, even though this additional weight is only useful for the number of seconds required to raise the landing gear.

Another solution may be to reduce the power demands of other non-critical aircraft systems while the landing gear is being raised. For example, power may be routed from the environmental control system to the landing gear actuators. While routing power according to the current load demands saves weight when compared to a power system that is sized to accommodate all simultaneous loads, doing so can lead to a reduction in the life of various systems due to the low voltage operation resulting from the transfer of power between systems.

Thus, the different currently available solutions to providing power to the landing gear system for raising and lowering the landing gear while simultaneously powering other aircraft systems may be impractical and/or infeasible. Accordingly, there is a need for a method and apparatus for minimizing the challenges described above.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for aerodynamically-assisted landing gear operations. The various embodiments described herein reduce the amount of power required by the aircraft landing gear actuators to raise and lower the landing gear. The concepts disclosed below provide a lift-producing body attached to the landing gear assemblies that assist the landing gear actuators in retracting and deploying the landing gear. In doing so, the power required by the landing gear actuators to operate the landing gear is reduced, which allows for a reduction in the size of the applicable power system, while maintaining an adequate power supply for all operating systems during landing gear operations.

According to one aspect of the disclosure provided herein, a landing gear actuation device includes a lift-producing body that is configured for attachment to a landing gear assembly. The lift-producing body is capable of being reconfigured while the landing gear assembly is being raised or lowered, allowing the direction of lift to be controlled to assist either raising or lowering of the landing gear assembly. Reconfiguring the lift-producing body allows for the created lift to be maximized at any given time during gear operation and/or for the resulting drag to be minimized during climb and descent when the landing gear is deployed in flight. This reconfiguring may occur by rotating the lift-producing body to vary the angle of attack, by changing the shape of the lift-producing body, and by utilizing active flow control techniques. According to various implementations, the lift-producing body may include a single, one-piece wing or two wings. With either implementation, embodiments allow for the wings to be deployed and stowed using folding or telescoping actions.

According to another aspect, a landing gear actuation system includes a landing gear assembly and a lift-producing body attached to the landing gear assembly. The lift-producing body includes an airfoil that is shaped to provide lift to assist the operation of the landing gear assembly. This lift production is controllable to maximize the length of time that the lift-producing body is capable of assisting the raising or lowering of the gear assembly. The mechanism for controlling the lift may include rotating the lift-producing body to change the angle of attack relative to the ambient airflow. Alternatively, the mechanism for controlling lift may include discharging air from one or more holes in the lift-producing body, affecting the lift created by the air flowing over the surface.

According to yet another aspect, a method for assisting landing gear actuation during an aircraft flight includes providing a lift-producing body attached to a landing gear assembly. The lift-producing body is configured to create lift that will assist in raising or lowering the landing gear assembly when exposed to the ambient airflow. Implementations may include deploying the lift-producing body upon initiating the retraction of the landing gear assembly. Deploying the lift-producing body may include reconfiguring the lift-producing body from a stowed configuration to a lift-producing configuration.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
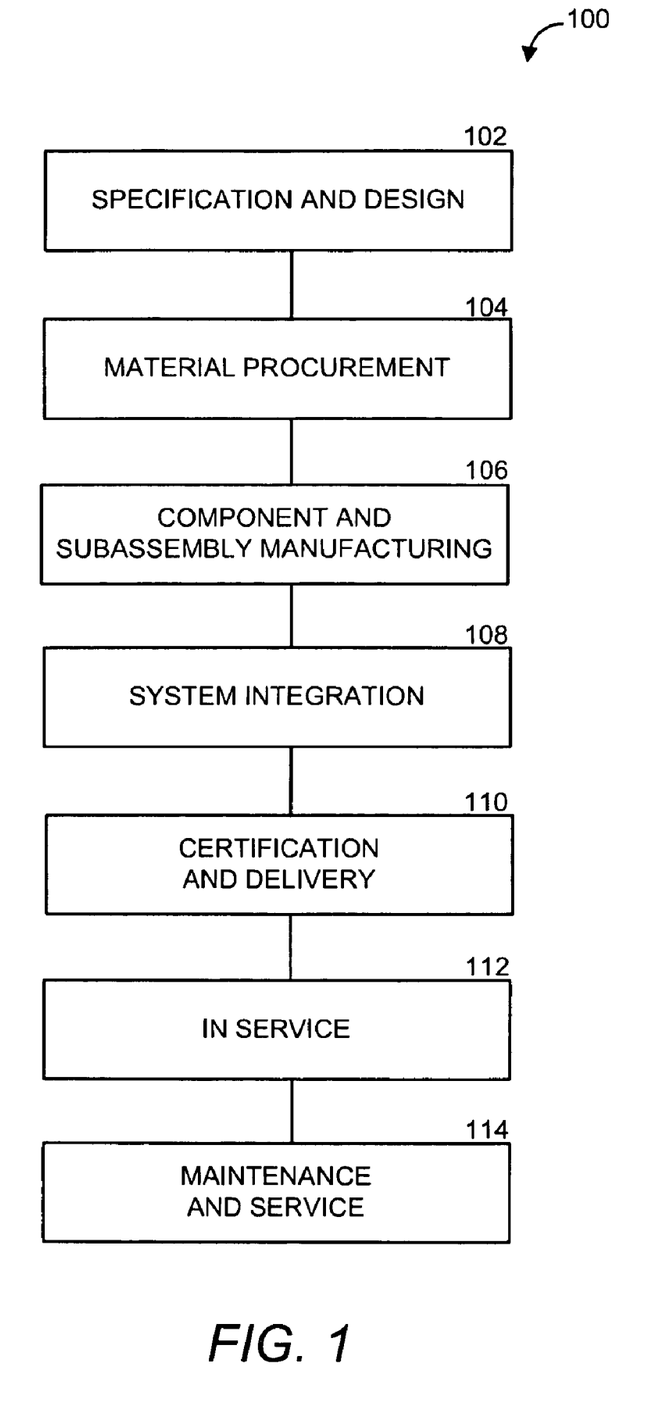
FIG. 1 is a flow diagram of aircraft production and service methodology.
Figure 2:
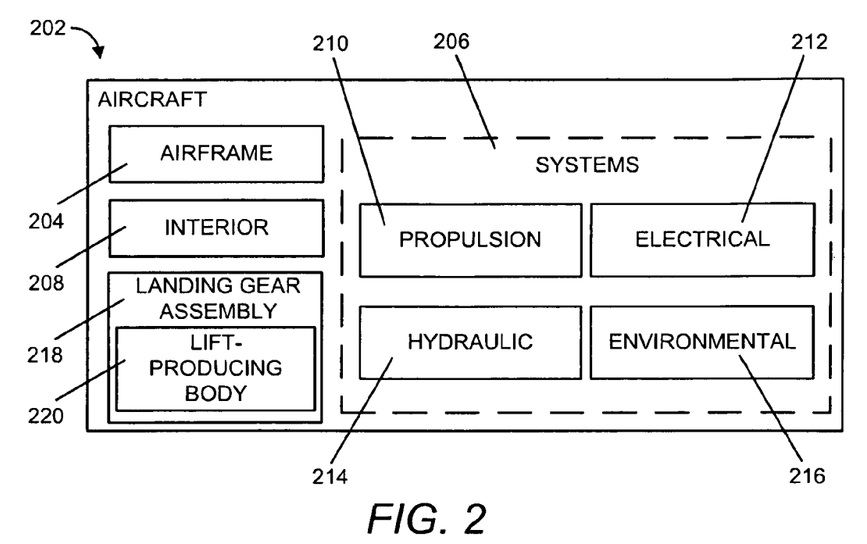
FIG. 2 is a block diagram of an aircraft according to various embodiments presented herein.

The following detailed description is directed to apparatus and methods for aerodynamically assisting the retraction and deployment of aircraft landing gear. In the following detailed description, references are made to the accompanying drawings that form a part hereof, and which are shown by way of illustration, specific embodiments, or examples. Referring now to the drawings, in which like numerals represent like elements through the several figures, aerodynamically-assisted landing gear according to the various embodiments will be described. Embodiments of the disclosure may be described in the context of an aircraft manufacturing and service routine 100 as shown in FIG. 1 and an aircraft 202 as shown in FIG. 2. During pre-production, exemplary routine 100 may include specification and design 102 of the aircraft 202 and material procurement 104. During production, component and subassembly manufacturing 106 and system integration 108 of the aircraft 202 takes place. Thereafter, the aircraft 202 may go through certification and delivery 110 in order to be placed in service 112. While in service by a customer, the aircraft 202 is scheduled for routine maintenance and service 114 (which may also include modification, reconfiguration, refurbishment, and so on).

Each of the operations of routine 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 202 produced by exemplary routine 100 may include an airframe 204, a plurality of systems 206, an interior 208, and landing gear assemblies 218. Examples of high-level systems 206 include one or more of a propulsion system 210, an electrical system 212, a hydraulic system 214, and an environmental system 216.

As discussed briefly above, landing gear operations place an enormous demand on the electrical system 212 or hydraulic system 214 that feeds not only the landing gear actuators to raise and lower the landing gear assemblies 218, but also other aircraft systems 206. Providing a system 206 that is capable of handling the simultaneous loads that are present during takeoff, climb out, and landing is inefficient due to the fact that the additional weight associated with the larger, heavier system 206 is carried for an entire flight, even though the increased power demands exist for less than a minute of the flight while the landing gear is being retracted and deployed. Similarly, as discussed above, powering down non-critical systems 206 to power the landing gear operations is not ideal as it may adversely affect the lifespan of the systems from which power is routed. The embodiments described herein provide one or more lift-producing bodies 220 attached to the landing gear assemblies 218 to assist in landing gear operations. As will be described in greater detail below with respect to FIGS. 3-10, the lift-producing body 220 may include any type of wing, shell, or other structure that is functional to create aerodynamic lift from exposure to an ambient airflow.

Figure 3:
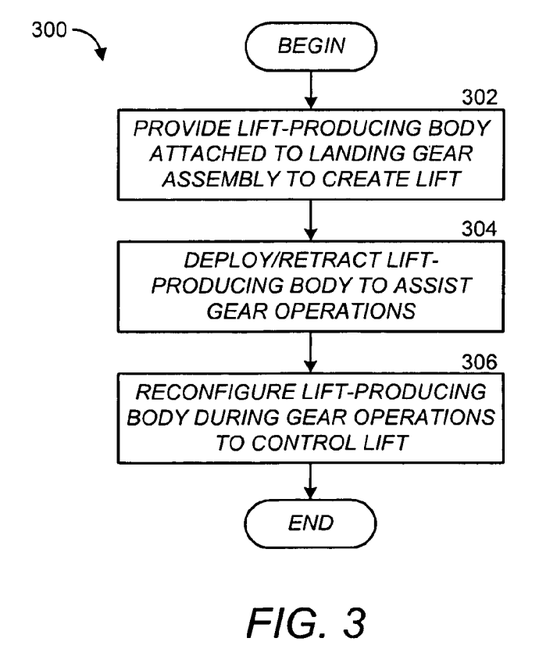
FIG. 3 is a flow diagram illustrating a method of providing aerodynamic lift assistance to a landing gear assembly according to various embodiments presented herein.

FIG. 3 shows a routine 300, in which aerodynamic techniques are applied to landing gear assemblies 218 utilizing the concepts and technologies described in greater detail below to create aerodynamic lift that may be used to assist in the raising and lowering of the landing gear. By creating an upward or downward aerodynamic force that assists the landing gear actuators in raising or lowering the landing gear, smaller actuators may be used, which in turn reduces the power demand on the corresponding system 206. As a result, the corresponding systems 206 may be smaller without requiring extensive re-routing of power within systems 206 to allow for the operation of the landing gear.

The routine 300 starts at operation 302, where the lift-producing body 220 is attached to the landing gear assembly 218 to create lift when exposed to an ambient airflow. At operation 304, the lift-producing body 220 may be deployed for assisting in the raising of the landing gear assembly 218, or may be retracted for stowage, as discussed below with respect to FIGS. 5 and 6. Finally, at operation 306, the lift-producing body 220 may be reconfigured as described below with respect to FIGS. 4-10 while the landing gear assembly 218 is being raised or lowered. Reconfiguring the lift-producing body 220 in flight enables control of the lift created by the lift-producing body 220 as the landing gear assembly 218 rotates into position by changing the angle of attack of the lift-producing body 220.

Each of the operations of the routine 300 may be performed or carried out in any order by a system integrator, a third party, and/or an operator (e.g. a customer). For the purposes of this description, a system integrator may include without limitation any number of aircraft manufacturers and major-system subcontractors; a third party may include without limitation any number of vendors, subcontractors, and suppliers; and an operator may include an airline, leasing company, military entity, service organization, or other entity that may be operating an aircraft 202 utilizing the various embodiments described herein.

Figure 4:
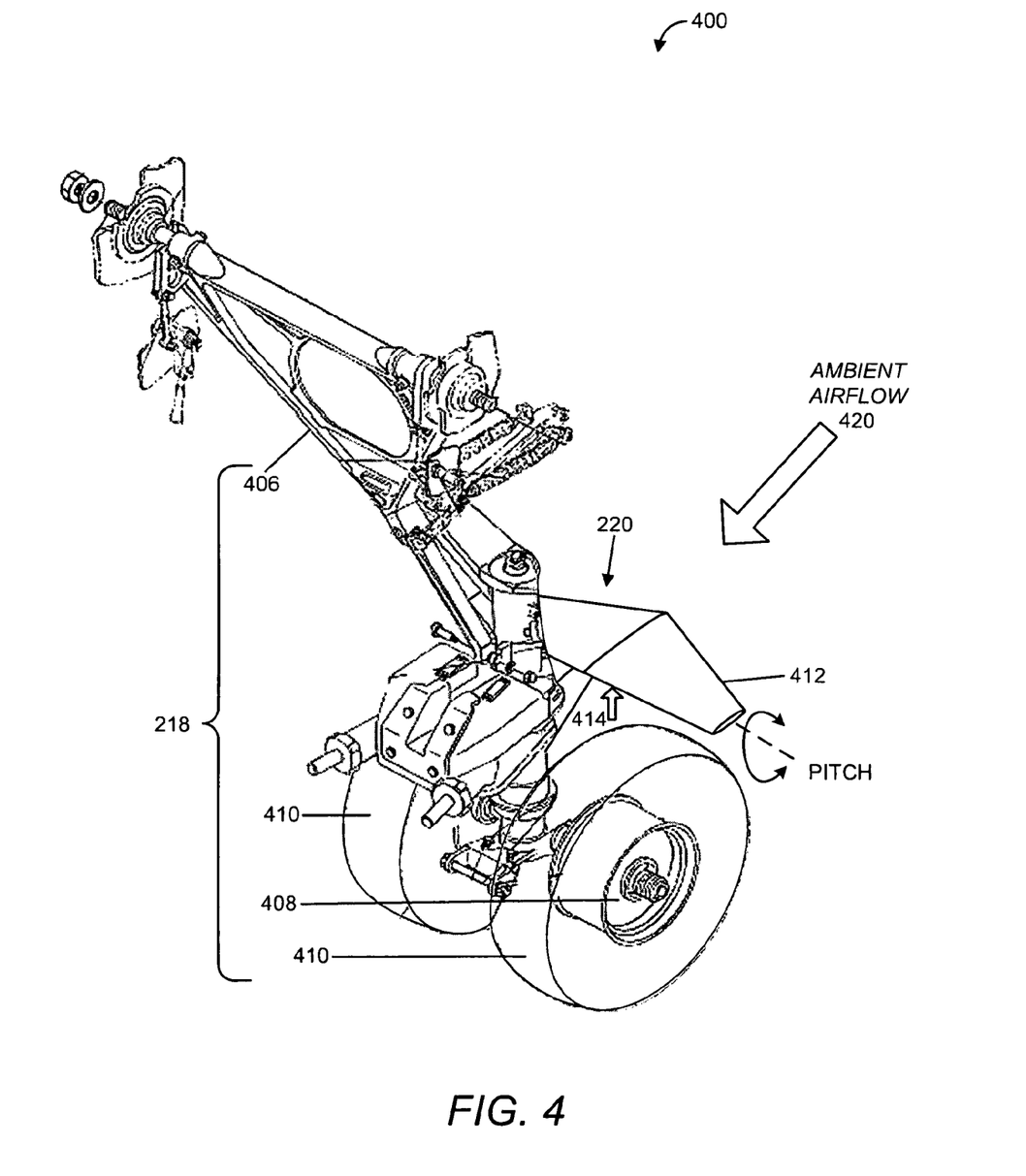
FIG. 4 is a perspective view of a landing gear actuation system showing a one-piece controllable actuation device attached to a landing gear assembly according to various embodiments presented herein.

FIG. 4 shows a landing gear actuation system 400 according to one embodiment. The landing gear actuation system 400 includes a landing gear assembly 218 and a lift-producing body 220. For simplicity, the landing gear assembly 218 is shown to include a strut 406, wheels 408, and tires 410. However, it should be appreciated that the landing gear assembly 218 additionally includes all other components that allow for proper landing gear functionality, including but not limited to one or more actuators, brake systems, and electrical components. It should also be appreciated that the embodiments described herein are not limited to the various landing gear assembly configurations shown in the figures. Rather, the concepts described herein may be applied to any type of landing gear assemblies, nose or main, with any number and type of wheels, struts, and actuation methods. It will become clear from the disclosure below that the type of lift-producing body 220 that is appropriate for any given implementation may vary according to the configuration of the landing gear assembly to which it will be attached.

The landing gear actuation system 400 shown in FIG. 4 provides a lift-producing body 220 that includes a one-piece wing 412 mounted to a front surface of the landing gear assembly 218 in the ambient airflow 420. According to this embodiment, the one-piece wing 412 has a wingspan that is substantially equivalent to or smaller than the width defined by the distance between the outer tire walls of the landing gear assembly 218. Because the one-piece wing 412 is not wider than the landing gear assembly 218, the one-piece wing 412 will fit within an existing landing gear bay without requiring the one-piece wing 412 to fold or otherwise retract for stowage. As will be described in detail below, larger and more complex lift-producing bodies may be utilized for larger aircraft landing gear assemblies 218, these larger surfaces requiring methods of stowing within the aircraft wheel well when the landing gear assembly 218 is fully retracted.

When the landing gear assembly 218 is deployed in the down position, the one-piece wing 412 will be exposed to the ambient airflow 420 to create lift 414. Depending on the shape of the airfoil and the angle of attack of the airfoil with respect to the ambient airflow 420, the lift 414 will create an upward force that will assist the gear actuators (not shown) when raising the landing gear assembly 218 and that could additionally assist in providing lift 414 to the aircraft in low-speed environments in which the landing gear is deployed. Although the peak loads that are placed on the gear actuators typically occur during retraction of the landing gear assembly 218, the one-piece wing 412, and all other lift-producing bodies 220 described herein, may be utilized to create lift 414 in the downward direction to assist the gear actuators when lowering the landing gear assembly 218. For example, a symmetric airfoil may be used for the one-piece wing 412 such that varying the angle of attack by pitching the one-piece wing 412 up and down past horizontal will change the direction of lift 414 to create an upward force or a downward force as desired to assist in the raising or lowering of the landing gear assembly 218, respectively.

It should be appreciated that a small actuator may be used to control the pitch of the one-piece wing 412. If the one-piece wing 412 is not to be utilized to assist in lowering the landing gear assembly 218, then the shape of the airfoil used in the one-piece wing 412 can be optimized to maximize the upward lift 414 to assist in raising the landing gear assembly 218. Even when the application of the lift-producing body 220 prioritizes gear retraction assistance, for the reasons described below, various embodiments provided herein allow for different methods of controlling the lift-producing body 220 in order to maximize the amount of lift 414 being created, maximize the duration of time during gear retraction that the lift-producing body 220 is able to provide assistance, and/or to minimize the drag being created by the lift-producing body 220.

As the landing gear assembly 218 rotates upwards towards the landing gear bay, a fixed lift-producing body 220 may experience a continuous change in the angle of attack with respect to the ambient airflow 420. A fixed lift-producing body 220 would only be positioned at an optimum angle of attack that maximizes the lift 414 produced for a very short period of time. After the landing gear assembly 218 rotates beyond the optimum angle of attack, the amount of lift 414 created by a fixed lift-producing body 220 would rapidly decrease while the drag created by the lift-producing body 220 increases until the effects of the fixed lift-producing body 220 potentially have a negative impact on the efficiency of the landing gear actuation system 400.

As will be described in greater detail below, to manage the lift 414 and drag created by the lift-producing body 220 at any given time during the operation of the landing gear assembly 218, the embodiments described herein provide for pitch control, active flow control, airfoil shape control, and deployment and retraction control techniques. By employing these techniques, the lift-producing body 220 can be configured to provide the maximum amount of lift 414 at all times of landing gear assembly 218 operations until the drag disadvantages overcome the lift 414 benefits. When the drag outweighs the lift 414 benefits, various implementations allow for the retraction of the lift-producing body 220.

Figure 5:
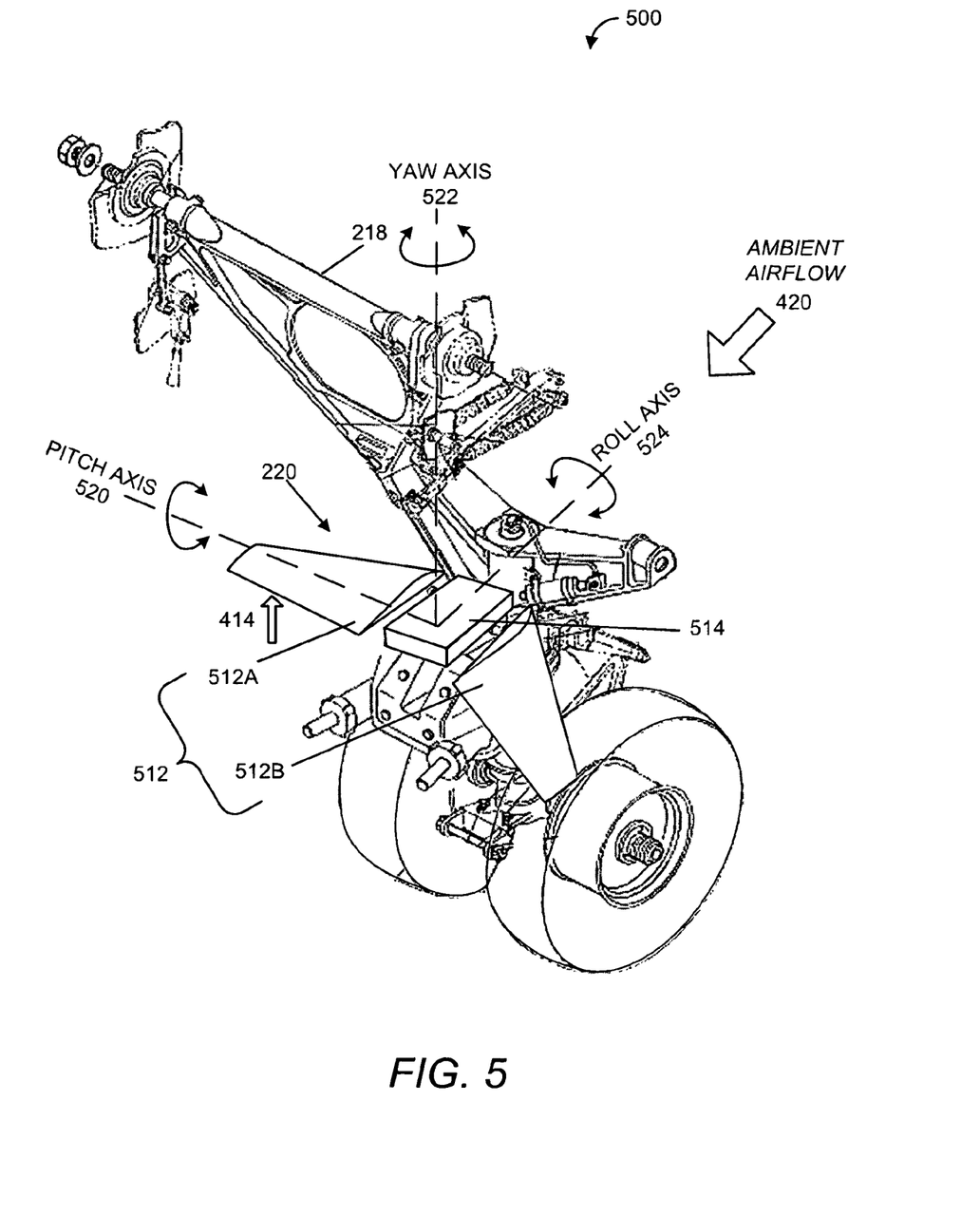
FIG. 5 is a perspective view of a landing gear actuation system showing a two-piece retractable and controllable actuation device attached to a landing gear assembly according to various embodiments presented herein.

Looking at FIG. 5, an alternative landing gear actuation system 500 is shown that includes a two-piece wing 512 attached to the landing gear assembly 218. In this embodiment, the lift-producing body 220 extends out past the width of the tires to increase the size of the device and to increase the quantity of lift 414 that is produced. As a result, the lift-producing body 220 is created as a two-piece wing 512 that can be retracted to allow for stowage within the aircraft wheel well and to provide the ability to virtually eliminate lift 414 and/or drag when appropriate to do so during landing gear operations. Although the two-piece wing 512 is shown to be attached to the landing gear assembly 218 behind the strut with respect to the direction of the ambient airflow 420, it should be understood that the attachment location is a design choice that may depend on any number of factors including, but not limited to, space availability on the landing gear assembly 218 for the lift-producing body 220, airflow obstructions and pathways, and space limitations in the wheel well.

While the landing gear assembly 218 is stowed, each wing 512A and 512B of the two-piece wing 512 is folded inward toward or against the landing gear assembly 218. It should be appreciated that the wings 512A and 512B may be configured to fold upward, downward, forward, or aft, as allowed by the particular configuration of the landing gear assembly 218 and the corresponding wheel well or landing gear bay in which the landing gear actuation system 500 is stowed. When the landing gear assembly 218 is lowered, depending on whether or not the lift-producing body 220 is to be used to assist in the deployment of the landing gear assembly 218, the two-piece wing 512 may be deployed or folded outward and locked into an operational position. This deployment of the two-piece wing 512 may be accomplished using the controller 514. The controller 514 may include any number and type of actuators that are capable of folding the two-piece wing 512 between stowed and operational positions.

In addition, the controller 514 may also include the functionality to control the orientation of the wings 512A and 512B while producing lift 414. For example, as described above with respect to the one-piece wing 412, the two-piece wing 512 may be reconfigured during flight to change the angle of attack of the wings 512A and 512B during gear retraction. By rotating the wings 512A and 512B to maintain an attitude approximately parallel to the main body of the aircraft as the position of the landing gear assembly 218 with respect to the aircraft changes, the amount of lift 414 provided by the two-piece wing 512 may be maximized and the drag minimized.

The ambient airflow 420 over the wings 512A and 512B may be monitored to provide feedback to the controller 514, or other processor that provides instructions to the controller 514, for initiating a reconfiguration in the pitch of the wings 512A and 512B to compensate for the changing angle of attack as the landing gear assembly 218 is raised or lowered. Alternatively, the landing gear actuation system 500 may be preprogrammed or mechanically designed to reconfigure the two-piece wing 512 in a predictable fashion according to a timer initiated when the landing gear operations commence or at any time according to the position of the landing gear assembly 218. At a predetermined time or position prior to the landing gear assembly 218 entering the wheel well, the controller 514 will retract and stow the wings 512A and 512B.

Many landing gear assemblies 218 rotate around a strut axis that is substantially parallel to and collinear with the strut such that the wheels 408 turn away from the direction of aircraft flight as the landing gear assembly 218 is retracted upward into the wheel well. In these situations, the controller 514 may not only rotate the lift-producing body 220 around a pitch axis 520, but also around a yaw axis 522 and a roll axis 524 so that the lift-producing body 220 is controllable in three dimensions to an extent that is limited by clearance between the landing gear assembly 218 and the lift-producing body 220. In an alternative embodiment, the wings 512A and 512B are controllable independently of one another. In this embodiment, varying flight characteristics may dictate that the wings 512A and 512B be oriented differently with respect to the ambient airflow 420 and/or the landing gear assembly 218. In one implementation, the wings 512A and 512B may be configured independently to direct the corresponding lift 414 forces in different directions to aid in the rotation of the wheels 408 around the strut axis as the landing gear assembly 218 is retracted.

Figure 6:
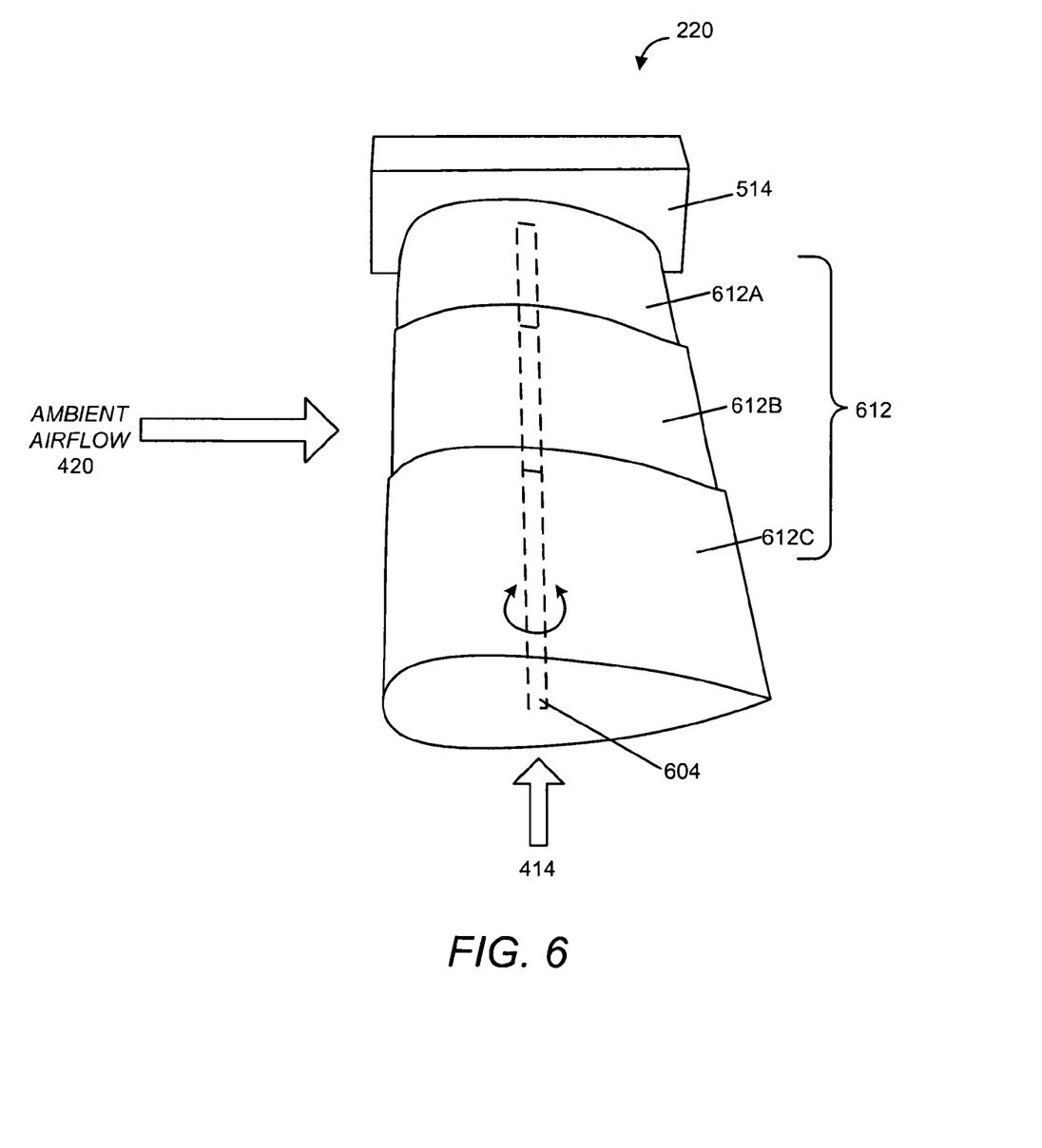
FIG. 6 is a perspective view of a telescoping actuation device according to various embodiments presented herein.

Another method for retracting and deploying the lift-producing body 220 is shown in FIG. 6. According to this embodiment, the lift-producing body 220 includes a telescoping wing 612. For clarity, only one half of the lift-producing body 220 is shown. The other half of the lift-producing body 220, being a mirror image of the telescoping wing 612 shown in FIG. 6, would be mounted opposite the telescoping wing 612 to complete the lift-producing body 220. The telescoping wing 612 includes three wing sections 612A-612C attached to a controller 514. It should be understood that the telescoping wing 612 may include any number of wing sections utilizing any airfoil shape.

To deploy the telescoping wing 612, pneumatic power systems may be used to force air into the interior of the wing sections 612A-612C, causing the wing sections 612A-612C to slide outward on a telescoping spar 604 until the telescoping spar 604 is fully extended and/or each wing section 612A-612C has extended to a mechanical stop that prevents further expansion. Retraction of the telescoping wing 612 may similarly occur by evacuating the air within the wing sections 612A-612C or by mechanically retracting the telescoping wing 612 using actuators so that the various wing sections 612A-612C nest within one another. For example, in the retracted configuration (not shown), the wing section 612C would remain exposed to the ambient airflow 420, while the wing section 612B would be nested within the wing section 612C, and the wing section 612A would be nested within the wing section 612B. It should be appreciated that the telescoping wing 612 may be configured such that the wing section 612A remains exposed to the ambient airflow 420 in the retracted configuration such that the wing section 612B nests within the wing section 612A and the wing section 612C nests within the wing section 612B.

The controller 514 may include the power system utilized to deploy and retract the telescoping wing 612. The controller 514 may additionally include one or more actuators for rotating the telescoping wing 612 around the telescoping spar 604 in order to control the angle of attack of the telescoping wing 612. As discussed above with respect to the one-piece wing 412 and the two-piece wing 512, the telescoping wing 612 may be reconfigured during flight to compensate for the dynamic angle of attack created by the movement of the landing gear assembly 218 as it rotates upward into the wheel well during retraction and downward out of the wheel well during deployment.

Figure 7:
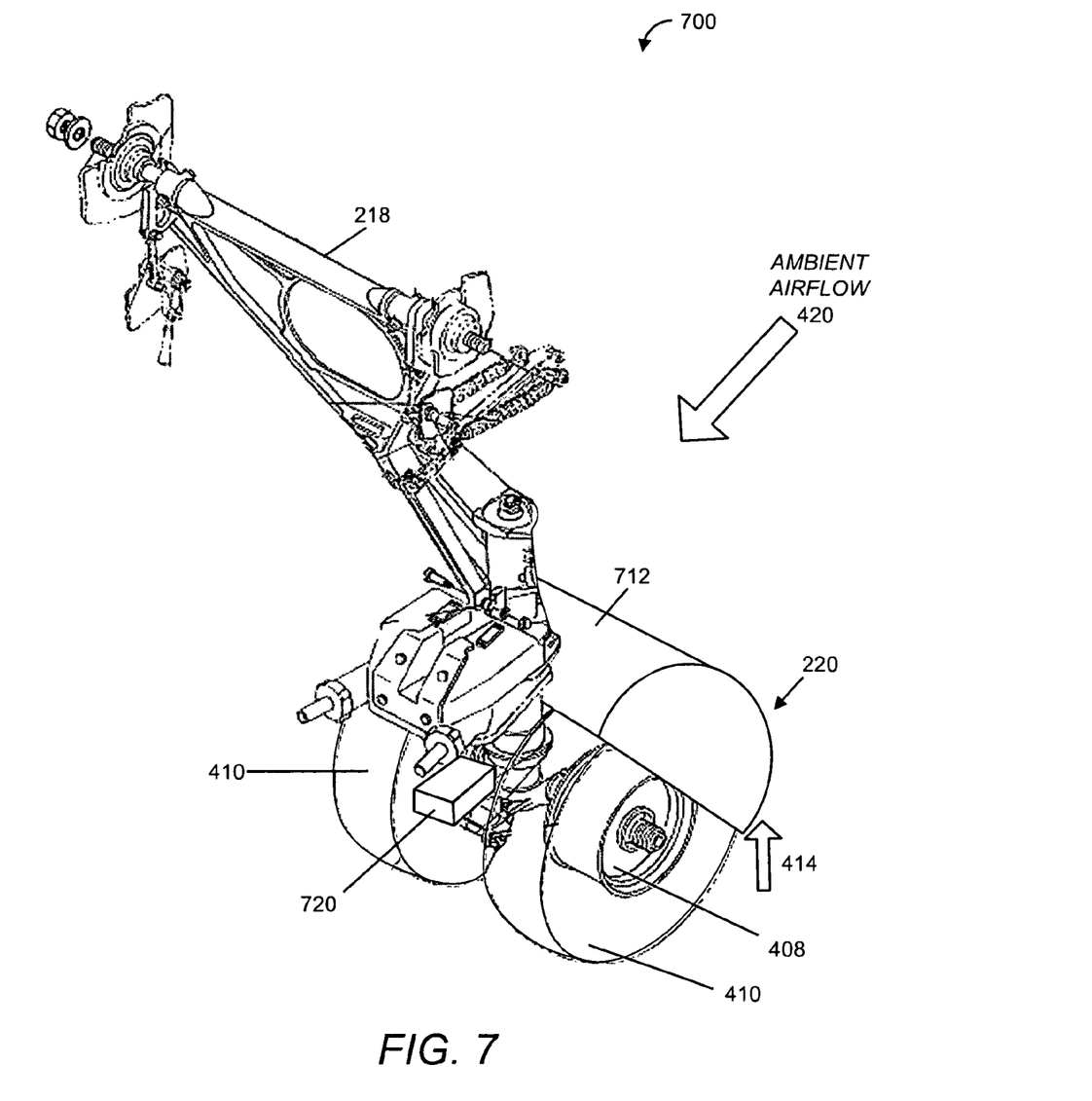
FIG. 7 is a perspective view of a landing gear actuation system showing a lifting shell attached to a landing gear assembly according to various embodiments presented herein.

FIG. 7 shows a landing gear actuation system 700 in which an aerodynamic shell 712 is used as a lift-producing body 220 to minimize drag caused by the rotation of the wheels from takeoff and to create lift 414 from the flow of ambient air over the aerodynamic shell 712. The aerodynamic shell 712 may be deployable in that it rotates downward into place over at least a forward portion of the tires 410, or it may be fixed so that it is permanently in place without interfering with the rotation of the tires 410 during takeoff and landing. The aerodynamic shell 712 may be a hard, inflexible material or may be a flexible material that is pulled into position by actuators during deployment.

After takeoff, the tires 410 of an aircraft continue to spin. The direction of spin creates lift 414 that may counter the upward rotation of the landing gear assembly 218 during retraction. According to one embodiment, the aerodynamic shell 712 mitigates this effect by disrupting the airflow around the tires 410 as they spin from the takeoff. In an alternative embodiment, the landing gear actuation system 500, with or without the use of the aerodynamic shell 712, includes a wheel drive system 720 that is operative to activate the wheel brakes to stop the spinning from takeoff and to further drive the wheels in a reverse direction to create lift 414 in the direction of retraction in order to reduce the load on the gear actuators.

Figure 8:
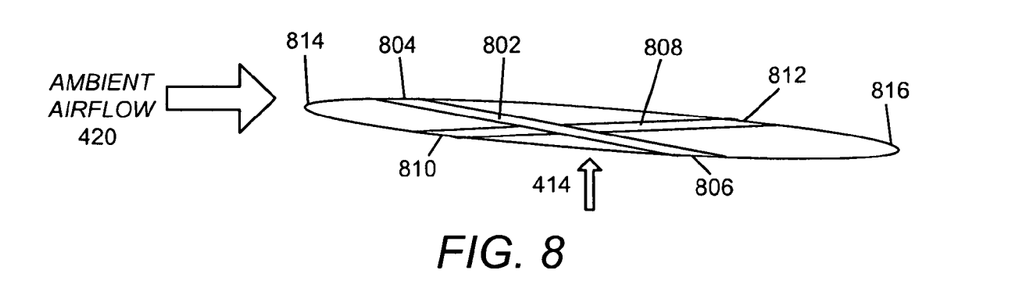
FIG. 8 is a cross-sectional view of an actuation device showing air channels and corresponding ports used within an airfoil for controlling ambient airflow when creating lift according to various embodiments presented herein.

FIG. 8 shows a cross-sectional view of a wing 800. The wing 800 utilizes fluid dynamics active flow control techniques to manage the lift 414 produced by the wing 800 by controlling the boundary layer separation of the flow over the wing 800. Rather than rotating the wing 800 to maintain lift 414 during retraction of the landing gear assembly 218, or in addition to rotating the wing 800, air may be blown through an array of holes in the wing 800 to interact with and change the flow characteristics of the ambient airflow 420. One embodiment provides for the opening and closing of ports 804, 806, 810, and 812 in the surface of the wing 800 to vary the lift 414 created by the wing 800. For example, opening the ports 804 and 806 allows ambient air to flow through air channel 802 from a location proximate to the leading edge 814 of the wing 800 to a location proximate to the trailing edge 816 of the wing 800. The resulting disruption of the ambient airflow 420 around the wing 800 can be used to create lift 414 at desired locations on the wing 800 during the landing gear assembly 218 retraction operations.

Similarly, ports 810 and 812 may be used to control airflow through the air channel 808 to create or manipulate the lift 414 produced by the wing 800. The configuration of the air channels 802 and 808, along with the corresponding ports 804, 806, 810, and 812, may be determined using known active flow control techniques according to the ambient airflow 420 characteristics with respect to the lift-producing body 220, landing gear assembly 218, and landing gear retraction operational parameters of the particular aircraft. It should be appreciated that air may be alternatively blown through the channels using air sources other than the ambient airflow 420.

Figure 9:
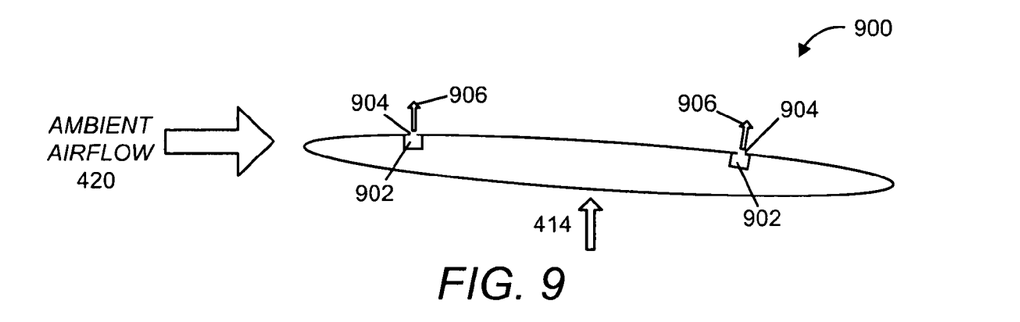
FIG. 9 is a cross-sectional view of an actuation device showing flow control actuators used within an airfoil for controlling ambient airflow when creating lift according to various embodiments presented herein.

FIG. 9 shows an alternative embodiment that utilizes active flow control techniques to control the lift 414 creation by the lift-producing body 220 while the landing gear assembly 218 is retracted upward toward the aircraft. According to this embodiment, a cross-section of a wing 900 shows flow control actuators 902. The flow control actuators 902 are devices that provide for air to be pulsed out of small apertures 904 in the wing 900. The actuating flow 906 that exits the surface of the wing 900 interacts with the ambient airflow 420 to alter the flow in a manner that changes the lift characteristics of the wing 900. The flow control actuators 902 may be piezoelectric actuators, synthetic jet actuators, powered resonance tube actuators, or any other type of flow control actuator 902 that is capable of producing an actuating flow to disrupt the ambient airflow 420 over the surface of the wing 900 in a manner that suitably alters the lift 414 being generated.

Figure 10:
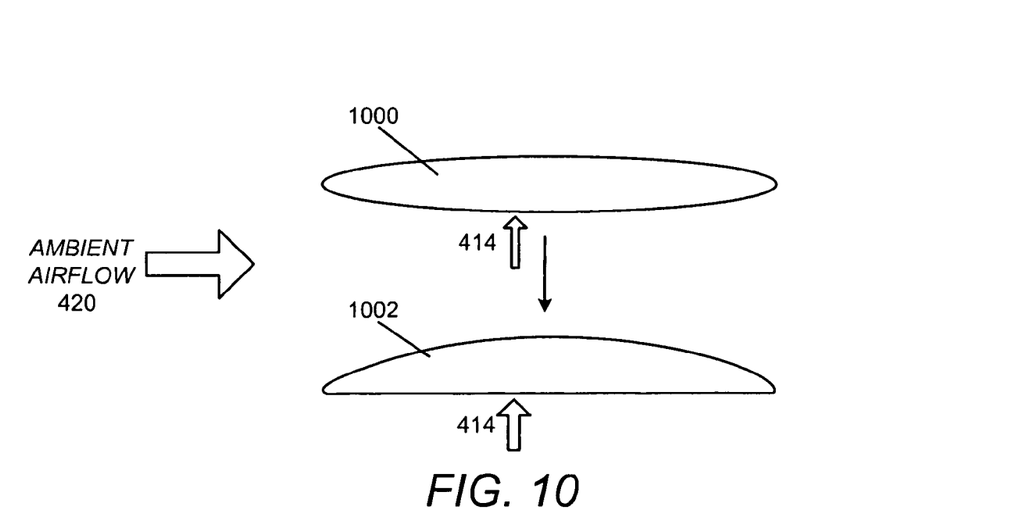
FIG. 10 is a cross-sectional view of an actuation device showing a transformation in the surface shape of the actuation device according to various embodiments presented herein.

FIG. 10 simplistically illustrates one embodiment for modifying the lift 414 generated by the lift-producing body 220 while the landing gear assembly 218 is rotating upward into the wheel well. According to this embodiment, the lift-producing body 220 may include one or more actuators embedded within the lift-producing body 220 or within a corresponding controller, such as the controller 514 shown in FIG. 5, that are capable of mechanically altering the shape of the airfoil 1000. As seen in FIG. 10, activation of the actuators alters the shape of the airfoil 1000 to the shape of the modified airfoil 1002. Modifying the shape of the airfoil 1000 may include pushing, pulling, stretching, and/or compressing at least a portion of the skin of the lift-producing body 220. Alternatively, the lift-producing body 220 may be twisted using one or more actuators to similarly alter the lift-producing characteristics of the wing.

Based on the foregoing, it should be appreciated that technologies for assisting in the retraction and/or deployment of aircraft landing gear assemblies 218 are provided herein. Utilizing the embodiments described herein, lift-producing bodies 220 may be attached to existing or new landing gear assemblies 218 to provide lift 414 during landing gear operations that decreases the loads on the landing gear actuators used to raise and lower the gear. Various configurations described herein provide for one-piece wings 412, two-piece wings 512, and telescoping wings 612. Each lift-producing body 220 could be retracted, if necessary, to minimize the amount of space required by the lift-producing body 220 in the wheel well as the landing gear assembly 218 is stowed.

Each lift-producing body 220 also provides for reconfiguring to compensate for the changing orientation of the lift-producing body 220 with respect to the ambient airflow 420 as the landing gear assembly 218 is retracted. Reconfiguration may occur through altering the pitch of the lift-producing body 220, changing the shape of the external surface of the lift-producing body 220, through active flow control techniques, or any combination thereof. Utilizing the lift-producing bodies 220 described herein to aerodynamically assist landing gear operations reduces the loads on the power system, which allows for smaller power systems to be used, which ultimately saves weight and increases aircraft efficiency.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A landing gear actuation device, comprising:
a lift-producing body configured for attachment to a landing gear assembly to create an aerodynamic lift that assists operation of the landing gear assembly when exposed to an ambient airflow,
wherein the lift-producing body is reconfigurable during landing gear operation to rotate around a pitch axis to change the angle of attack of the lift-producing body to control the aerodynamic lift.

2. The landing gear actuation device of claim 1, wherein the lift-producing body is reconfigurable to maximize the aerodynamic lift or to minimize a drag created by the lift-producing body.

3. The landing gear actuation device of claim 1, wherein the lift-producing body comprises two wings.

4. The landing gear actuation device of claim 3, wherein the two wings are configured to deploy for operation and to retract for stowage.

5. The landing gear actuation device of claim 4, wherein the two wings being configured to deploy for operation comprises being configured to fold away from the landing gear assembly to a deployed operational configuration from a retracted stowed configuration.

6. The landing gear actuation device of claim 4, wherein the two wings being configured to retract for stowage comprises being configured to fold toward the landing gear assembly to a retracted stowed configuration from a deployed operational configuration.

7. The landing gear actuation device of claim 4, wherein each of the two wings comprises a plurality of wing sections, and wherein the lift-producing body being configured to deploy for operation and to retract for stowage comprises being configured to telescopically extend to a deployed operational configuration in which each of the plurality of wing sections is exposed to the ambient airflow, and to telescopically retract to a retracted stowed configuration in which a single wing section of each of the two wings is exposed to the ambient airflow.

8. The landing gear actuation device of claim 1, wherein the lift-producing body comprises a one-piece wing having a wing span that is less than or substantially equal to the width defined by the distance between outer tire walls of the landing gear assembly such that the one-piece wing does not interfere with stowage of the landing gear assembly.

9. The landing gear actuation device of claim 1, wherein the lift-producing body comprises two wings, the two wings being configured to attach to opposite sides of the landing gear assembly and to rotate around the pitch axis independently from one another such that lift created by each wing may be directed in a different direction to aid in rotation of the landing gear assembly during retraction or deployment of the landing gear assembly.

10. The landing gear actuation device of claim 1, wherein the lift-producing body comprises an active flow control mechanism operative to control the aerodynamic lift generated by the lift-producing body during landing gear operation.

11. The landing gear actuation device of claim 1, wherein the lift-producing body is further configured to alter the surface shape of the lift-producing body to control the aerodynamic lift generated by the lift-producing body during landing gear operation.

12. A landing gear actuation system, comprising:
a landing gear assembly; and
a lift-producing body attached to the landing gear assembly, the lift-producing body comprising an airfoil shaped to provide aerodynamic lift that assists operation of the landing gear assembly and a controlling mechanism operative to control the aerodynamic lift provided by the airfoil to maximize a duration of actuation assistance provided to the landing gear assembly during deployment or retraction of the landing gear assembly by rotating the lift-producing body to change an angle of attack of the lift-producing body with respect to the ambient airflow.

13. The landing gear actuation system of claim 12, wherein the lift-producing body comprises two wings, the two wings being configured to attach to opposite sides of the landing gear assembly, to deploy for providing landing gear actuation assistance, and to retract for stowage.

14. The landing gear actuation system of claim 12, wherein the lift-producing body comprises a one-piece wing having a wing span that is less than or substantially equal to the width defined by the distance between outer tire walls of the landing gear assembly such that the one-piece wing does not interfere with stowage of the landing gear assembly.

15. The landing gear actuation system of claim 12, wherein the lift-producing body is configured to telescopically extend to produce lift and to telescopically retract for stowage.

16. The landing gear actuation system of claim 12, wherein the controlling mechanism is operative to discharge air from at least one aperture in a surface of the lift-producing body to control the aerodynamic lift created by the airfoil.

17. The landing gear actuation system of claim 12, further comprising a wheel drive system operative to reverse a direction of wheel spin after aircraft takeoff to create aerodynamic lift that assists retraction of the landing gear assembly.

18. A method of assisting landing gear actuation during aircraft flight, the method comprising:
providing a lift-producing body attached to a landing gear assembly, the lift-producing body configured to create an aerodynamic lift that assists operation of the landing gear assembly when exposed to an ambient airflow; and
rotating the lift-producing body during operation of the landing gear assembly to control the aerodynamic lift or drag associated with the lift-producing body by changing an angle of attack of the lift-producing body with respect to the ambient airflow.

19. The method of claim 18, further comprising deploying the lift-producing body upon an initiation of a retraction of the landing gear assembly such that the lift-producing body reconfigures from a stowed configuration to a lift-producing deployed configuration.

20. A reconfigurable landing gear actuation system for providing aerodynamic lift to assist a landing gear actuator, the system comprising:
a landing gear assembly;
two wings attached to opposite sides of the landing gear assembly, wherein the two wings are shaped to provide aerodynamic lift that assists operation of the landing gear actuator, and wherein the two wings are configured to fold away from the landing gear assembly to a deployed operational configuration for providing landing gear actuator assistance and to fold toward the landing gear assembly to a retracted stowed configuration from the deployed operational configuration; and
a controller operative to rotate the two wings around a pitch axis to change an angle of attack of the two wings with respect to an ambient airflow to maximize a duration of the landing gear actuator assistance provided during deployment or retraction of the landing gear assembly.

21. A method of utilizing a controllable quantity of aerodynamic lift to assist a landing gear actuator, the method comprising:
providing a lift-producing body attached to a landing gear assembly, the lift-producing body configured to create the aerodynamic lift that assists the landing gear actuator when exposed to an ambient airflow;
deploying the lift-producing body upon an initiation of a retraction of the landing gear assembly such that the lift-producing body folds away from the landing gear assembly from a stowed configuration to a lift-producing deployed configuration;
reconfiguring the lift-producing body during the retraction of the landing gear assembly to control the aerodynamic lift created by the lift-producing body as the landing gear assembly raises and changes an angle of attack of the lift-producing body; and
retracting the lift-producing body from the lift-producing deployed configuration to the stowed configuration prior to entering an aircraft wheel well such that the lift-producing body folds toward the landing gear assembly to the stowed configuration.

22. A landing gear actuation device, comprising:
a lift-producing body configured for attachment to a landing gear assembly to create an aerodynamic lift that assists operation of the landing gear assembly when exposed to an ambient airflow,
wherein the lift-producing body is reconfigurable during landing gear operation to control the aerodynamic lift, and
wherein the lift-producing body comprises a one-piece wing having a wing span that is less than or substantially equal to the width defined by the distance between outer tire walls of the landing gear assembly such that the one-piece wing does not interfere with stowage of the landing gear assembly.

23. A landing gear actuation system, comprising:
a landing gear assembly; and
a lift-producing body attached to the landing gear assembly, the lift-producing body comprising
a one-piece wing having an airfoil shaped to provide aerodynamic lift that assists operation of the landing gear assembly and a wing span that is less than or substantially equal to the width defined by the distance between outer tire walls of the landing gear assembly such that the one-piece wing does not interfere with stowage of the landing gear assembly, and
a controlling mechanism operative to control the aerodynamic lift provided by the airfoil to maximize a duration of actuation assistance provided to the landing gear assembly during deployment or retraction of the landing gear assembly.

\* \* \* \* \*